Oct. 6, 1936.  2,056,757
MYKAS ADAMCIKAS, ALSO KNOWN AS MICHAEL ADAMTCHIK
VENTILATOR
Filed March 5, 1936  2 Sheets-Sheet 1
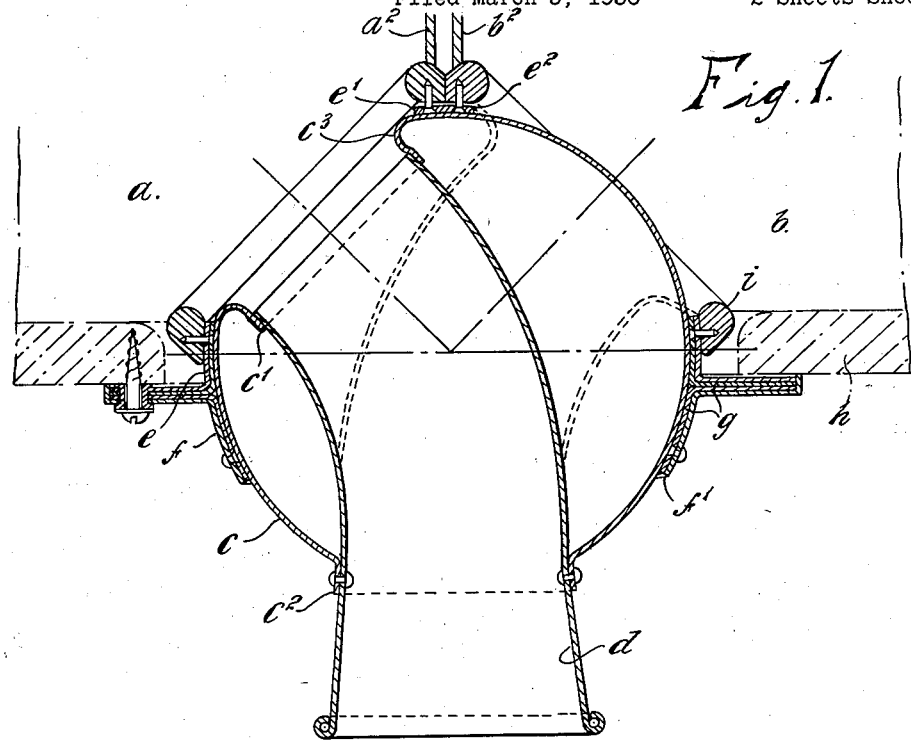
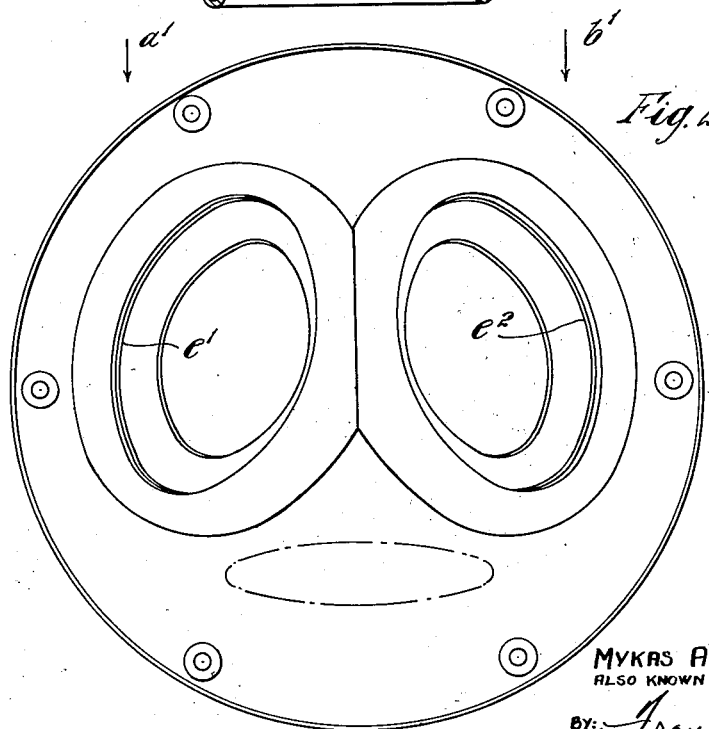
Inventor:
MYKAS ADAMCIKAS
ALSO KNOWN AS MICHAEL ADAMTCHIK
BY: Francis E. Boyce
ATTORNEY Oct. 6, 1936.  2,056,757
MYKAS ADAMCIKAS, ALSO KNOWN AS MICHAEL ADAMTCHIK
VENTILATOR
Filed March 5, 1936   2 Sheets-Sheet 2
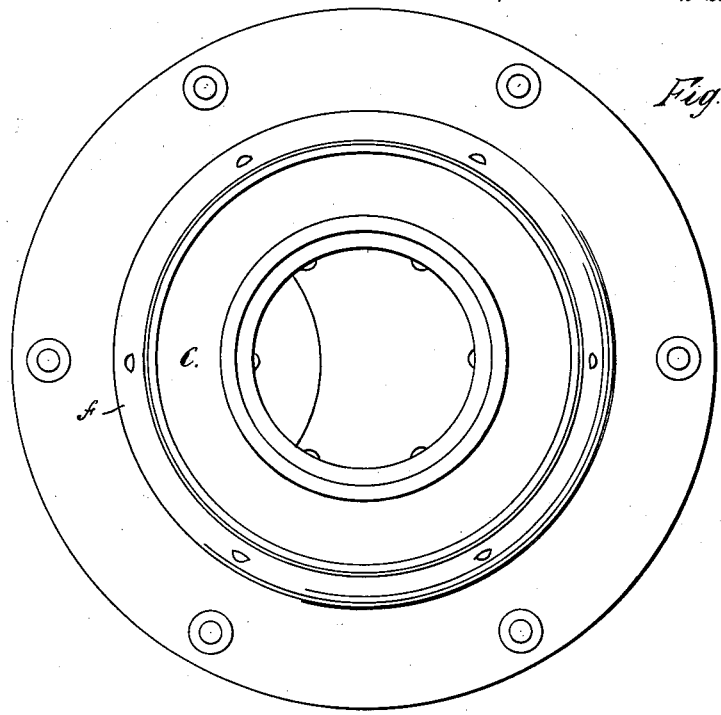
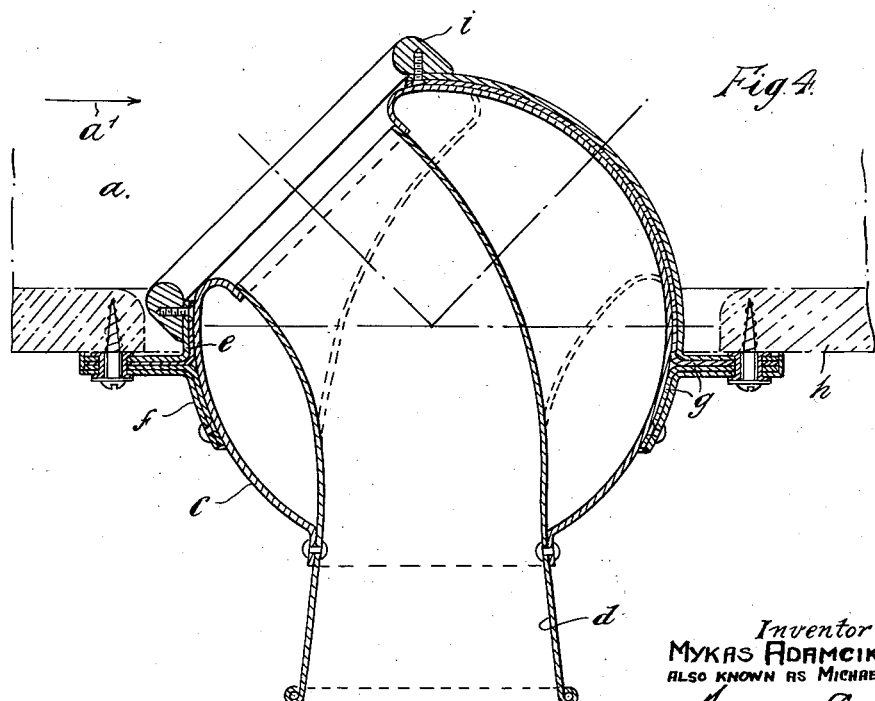
Inventor:
MYKAS ADAMCIKAS
ALSO KNOWN AS MICHAEL ADAMTCHIK
BY: Francis E. Boyce
ATTORNEY Patented Oct. 6, 1936

2,056,757

UNITED STATES PATENT OFFICE 2,056,757

VENTILATOR

Mykas Adamcikas, also known as Michael Adamtchik, Aldwych, London, England

Application March 5, 1936, Serial No. 67,226
In Great Britain September 9, 1935

4 Claims. (Cl. 98—40)

This invention relates to ventilators of the kind which consist of a nozzle extending through a spherical boss universally pivoted in a spherical socket, so as to be capable of being turned in the socket so that one end of the nozzle is alternatively covered or uncovered by the wall of the socket, and also so that the direction of the nozzle can be adjusted.

Valve-acting ventilation nozzles of the above described kind are used for controlling the inlet of air into the cabins of ships and like compartments, the air being conveyed under pressure to the cabins or the like by air trunks. It is usual in ships for the air trunks to the cabins to be duplicated, one trunk supplying cold air and the other trunk supplying hot air. For use with duplicated air trunks, it has already been proposed to construct a spherically universally pivoted valve-acting ventilation nozzle so that it can selectively permit the flow of air from either or both of the two air trunks.

The object of the present invention is to provide a spherically pivoted ventilation nozzle with which, whilst the closure and opening of the nozzle and also the direction of the nozzle are effected by rotation of the spherical boss of the nozzle in the spherical socket, the rotational movement to effect the closure or opening is recognizably distinct from the movement to adjust the direction of the nozzle.

A further object of the invention is to avoid resistances to the flow of air from the air trunks through the nozzles and thus avoid losses of pressure in the air trunks entailing undue expenditure of power in the propulsion of the air therethrough.

According to the invention, in a ventilation nozzle extending through a spherical boss pivoted in a spherical socket arranged to close the nozzle, the nozzle extends through the spherical boss in a curved direction so that the axis of the nozzle at the inlet end is at an angle to the axis of the nozzle at the outlet end. Conveniently the axis of the nozzle curves through 45° from the inlet to the outlet.

As a result of the angular relative situations of the inlet and outlet, rotation of the nozzle about the axis of the outlet displaces the inlet from or into a position in which it coincides with the corresponding opening in the spherical socket, whereas a gyratory movement of the nozzle adjusts within limits the direction of the outlet thereof without necessarily substantially affecting the degree of opening of the nozzle.

The angular relative situations of the inlet and outlet of the nozzle also permit the inlet aperture in the socket and the inlet of the nozzle to face, at any rate partially, the flow of air along the trunk, whilst the outlet of the nozzle is downwardly directed.

To avoid or minimize losses of air pressure in the trunk and nozzle, the borders of the inlet apertures of the socket and nozzle are rounded to present streamlined surfaces to the air flow instead of sharp edges. Also the passage through the nozzle suitably diverges.

Embodiments of the invention are illustrated by way of example on the accompanying drawings, in which:—

Fig. 1 is a vertical section of a valve-acting ventilator nozzle for delivering air from two adjacent air trunks.

Fig. 2 is a plan, with the air trunks omitted, and

Fig. 3 is an inverted plan thereof.

Fig. 4 is a view similar to Fig. 1 but of a ventilator for delivering air from a single air trunk.

Referring to Figs. 1 to 3, $a$ and $b$ are two adjoining air trunks delivering air, the direction of flow of the air being as indicated by the arrows $a^1$, $b^1$ in Fig. 2.

The adjoining walls $a^2$, $b^2$ of the two trunks $a$ and $b$ are indicated in Fig. 1.

$c$ is a hollow spherical boss formed of sheet metal and having an inturned flange $c^1$ around an aperture therein and an out-turned directed flange $c^2$ around another aperture therein.

$d$ is a divergent nozzle, having a curved axis, mounted by one end in and extending from the inturned flange $c^1$ through and protruding beyond the out-turned flange $c^2$.

The nozzle $d$ is secured in the flanges $c^1$, $c^2$ by rivets or spot welding or otherwise.

The spherical boss $c$ is rotatably mounted in a spherical socket consisting of a pair of radially flanged segmental spherical sleeves $e$ and $f$.

$g$ are felt or the like sleeves interposed as usual between the surfaces of the spherical boss $c$ and the spherical socket $e$ $f$, and serving to prevent leakage of air between these surfaces. The spherical socket $e$ $f$ is secured to the border of an aperture in the ceiling $h$ of the cabin, half beneath each air trunk $a$, $b$.

The spherical sleeve $e$ on the upper, inlet side of the socket has two apertures $e^1$, $e^2$, one $e^1$ situated to open into the air trunk $a$ whereas the other $e^2$ is situated to open into the air trunk $b$.

The inlet apertures $e^1$, $e^2$ of the socket are also so situated that with the outlet of the nozzle $d$ directed vertically downwards, rotation of the nozzle about a vertical axis can bring the inlet of the nozzle into full coincidence with either the aperture $e^1$ or the aperture $e^2$ and into intermediate positions wherein the inlet of the nozzle $d$ overlaps to various degrees both apertures $e^1$ and $e^2$. Thus the nozzle $d$ can be adjusted to receive cold and hot air from the trunks $a$ and $b$ in various proportions. The nozzle $d$ can also be set in a position wherein its inlet is covered and closed by the socket $e\ f$, as indicated in dot-dash lines in Fig. 2.

The spherical sleeve $f$ on the lower, outlet side of the socket has a single aperture $f^1$ of ample size to permit the outlet end of the nozzle $d$ to by gyrated through arcs of considerable radius about the centre of the spherical boss $c$. Thus the outlet of the nozzle $d$ can, within limits, be suitably directed.

The inlet apertures $e^1$, $e^2$ of the spherical socket may be circular but are preferably elongated horizontally in order to permit gyration of the nozzle $d$ without unduly affecting the proportioning of the air selected by simple rotation of the nozzle.

The projecting outlet end of the nozzle $d$ conveniently serves as a handle for effecting both gyration to open close or select the air flow and gyration to direct the outflow thereof.

As shown in Fig. 2, the inlets $e^1$ and $e^2$ are preferably inclined towards the direction of flow along the air trunks $a$, $b$.

To minimize loss of pressure in the air trunks and nozzle, the borders of the inlet apertures $e^1$, $e^2$ of the spherical socket are masked by a beading $i$ presenting a streamlined surface to the air flow, and the inturned flange $c^1$ of the spherical boss $c$ merges into the boss $c$ by a rounded portion $c^3$ of ample radius likewise to present a streamlined surface to the air flow.

In cases where the valve-acting nozzle is applied to a single air trunk, only one inlet aperture need be provided in the spherical socket, as shown in Fig. 4. In such case the inlet can be directed as shown directly facing the direction of the air flow, in the air trunk $a$, indicated by the arrow $a^1$, in Fig. 4.

I claim:

1. In a ventilator, a fixed spherical socket having an inlet aperture, a spherical boss rotatably mounted directly in said fixed spherical socket, and a nozzle extending in a curved direction through and secured in said spherical boss with the axis of said nozzle at the inlet end at an angle to the axis of said nozzle at the outlet end.

2. In a ventilator, a fixed spherical socket having two inlet apertures, a spherical boss rotatably mounted directly in said fixed spherical socket, and a nozzle extending in a curved direction through and secured in said spherical boss with the axis of said nozzle at the inlet end at an angle to the axis of said nozzle at the outlet end.

3. In a ventilator, a fixed spherical socket having an inlet aperture, a streamlined beading around the border of said inlet aperture, a spherical boss rotatably mounted directly in said fixed spherical socket, and a nozzle extending in a curved direction through and secured in said spherical boss with the axis of said nozzle at the inlet end at an angle to the axis of said nozzle at the outlet end.

4. In a ventilator, a fixed spherical socket having two inlet apertures, a streamlined beading around the border of each of said inlet apertures, a spherical boss rotatably mounted directly in said fixed spherical socket, and a nozzle extending in a curved direction through and secured in said spherical boss with the axis of said nozzle at the inlet end at an angle to the axis of said nozzle at the outlet end.

MYKAS ADAMCIKAS,
*Also known as*
MICHAEL ADAMTCHIK.